(12) United States Patent
Reynolds et al.

(10) Patent No.: US 6,848,007 B1
(45) Date of Patent: Jan. 25, 2005

(54) SYSTEM FOR MAPPING ADDRESSES OF SCSI DEVICES BETWEEN PLURALITY OF SANS THAT CAN DYNAMICALLY MAP SCSI DEVICE ADDRESSES ACROSS A SAN EXTENDER

(75) Inventors: Robert A. Reynolds, Travis, TX (US); John B. Haechten, Hayes, TX (US); Kenneth D. Smeltzer, Travis, TX (US)

(73) Assignee: Crossroads Systems, Inc., Austin, TX (US)

( * ) Notice: Subject to any disclaimer, the term of this patent is extended or adjusted under 35 U.S.C. 154(b) by 702 days.

(21) Appl. No.: 09/710,213

(22) Filed: Nov. 10, 2000

Related U.S. Application Data

(60) Provisional application No. 60/165,385, filed on Nov. 12, 1999.

(51) Int. Cl.[7] .............................................. G06F 15/16
(52) U.S. Cl. .......................... 709/245; 709/249; 710/3
(58) Field of Search .............................. 710/74, 2, 3, 9; 714/6, 4, 21; 711/111; 707/9; 709/213, 214, 249, 245

(56) References Cited

U.S. PATENT DOCUMENTS

| | | | |
|---|---|---|---|
| 5,805,920 A | 9/1998 | Sprenkle et al. | 395/821 |
| 5,812,754 A | 9/1998 | Lui et al. | 395/182.04 |
| 5,941,972 A | 8/1999 | Hoese et al. | 710/129 |
| 5,978,854 A | 11/1999 | Fujimori et al. | 709/245 |
| 6,199,112 B1 | 3/2001 | Wilson | 709/227 |
| 6,199,146 B1 | 3/2001 | Pence | 711/154 |
| 6,212,606 B1 | 4/2001 | Dimitroff | 711/147 |
| 6,460,113 B1 * | 10/2002 | Schubert et al. | 711/111 |
| 6,584,582 B1 * | 6/2003 | O'Connor | 714/21 |
| 6,643,795 B1 * | 11/2003 | Sicola et al. | 714/6 |
| 6,647,387 B1 * | 11/2003 | McKean et al. | 707/9 |
| 6,654,830 B1 * | 11/2003 | Taylor et al. | 710/74 |
| 6,658,590 B1 * | 12/2003 | Sicola et al. | 714/6 |
| 6,671,820 B1 * | 12/2003 | Kelman | 714/4 |

OTHER PUBLICATIONS

International Search Report of corresponding PCT Application No. PCT/US00 30959 dated Jun. 13, 2001.

* cited by examiner

*Primary Examiner*—Le Hien Luu
(74) *Attorney, Agent, or Firm*—Sprinkle IP Law Group

(57) ABSTRACT

The present invention provides a method and system for mapping addressing of SCSI devices between two SANs connected by a SAN extender over a packet-based network with use of a Fibre channel protocol over large distances. The present invention seamlessly interconnects graphically distinct SANs such that they operate as if they were local to one another by providing a means to generically and dynamically map SCSI device addresses between two SANs. The present invention provides a method and system for accessing a device from a host, wherein the host and device are in separate SANs interconnected by a transport layer, and wherein the interface between said transport layer and each of said SANs is a node. This method comprises, at each node, the steps of: mapping the device address into an intermediary device identifier, and mapping the intermediary device identifier into an address accessible by the host. Each node can be a Fibre channel-to-SCSI router, and the intermediary device identifier can comprise a node identifier and a generic device identifier. The transport layer can be a packet-based network.

49 Claims, 1 Drawing Sheet

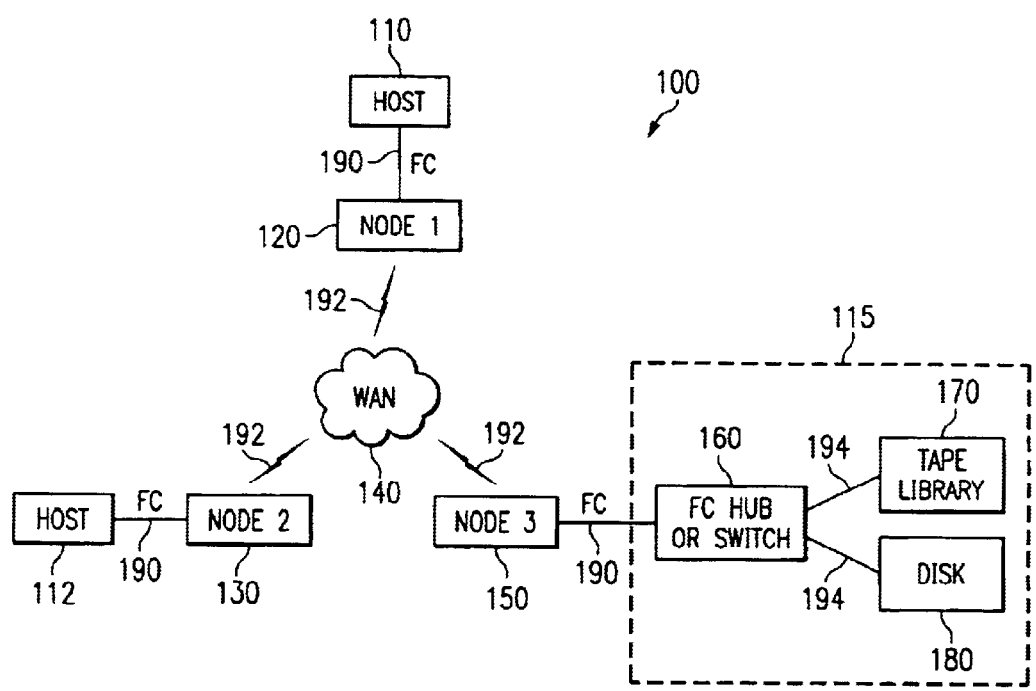

SYSTEM FOR MAPPING ADDRESSES OF SCSI DEVICES BETWEEN PLURALITY OF SANS THAT CAN DYNAMICALLY MAP SCSI DEVICE ADDRESSES ACROSS A SAN EXTENDER

This application claims the benefit of U.S. Provisional Application 60/165,385, which was filed on Nov. 12, 1999 and is hereby incorporated in reference herein.

TECHNICAL FIELD OF THE INVENTION

This invention relates generally to data and information communication systems and their operation and, more particularly, to the field of storage area networking. Even more particularly, the present invention relates to fibre channel storage area networks ("SANs") and to a method and system for mapping addressing of SCSI devices between two SANs.

BACKGROUND OF THE INVENTION

Dramatic growth in the amount of data that must be stored, combined with the need for faster, more reliable and more efficient data access and data management capabilities, have led many organizations to seek an improved way of storing, accessing and managing data. In traditional computer networks, each storage device is connected to only one server, and can be accessed only by that server. The computer protocol used to connect and transfer data between the server and storage device is called the small computer system interface, or SCSI. As more data must be stored and retrieved, organizations increasingly are finding that this one-to-one, or point-to-point, connection is not sufficiently fast, efficient and reliable to support growing demands for data access and storage. In addition, in most organizations today, data back-up—or creating a duplicate copy of data to protect it from corruption or loss—is accomplished by moving large volumes of stored data from a dedicated storage device over the primary computer network to a back-up storage device. Since the primary computer network also is responsible for conducting day-to-day computer operations, this added data movement results in substantial congestion, slowing all other computer operations.

Storage area networks, or SANs, which are computer networks dedicated to data storage, can help resolve some of these problems. A storage area network uses a different, higher-performance computer protocol, known as Fibre Channel, to transfer data. A storage area network also removes the one-to-one connection between servers and storage devices, and instead allows many servers to connect to and share access with many storage devices. The many-to-many connection enabled by the storage area network, combined with the Fibre Channel protocol, permits faster, more efficient, more reliable and more manageable data transfer processes. Furthermore, the storage area network, can be accomplished over data back-up operations, instead of over the primary computer network, thus substantially reducing congestion on the primary computer network and allowing much more efficient day-to-day operations.

Most storage devices in the market, however, continue to be sold with the small computer system interface. Additionally, most organizations have made significant investments in storage devices and servers that use the small computer system interface. Therefore, in order for devices of a Fibre Channel storage area network to function with storage devices that use SCSI, storage routers must be installed between these devices. In particular, storage routers are essential to shifting data back-up processes from a primary computer network to the storage area network, since most data back-up storage devices use the SCSI interface and can only connect to the storage area network through a storage router. As new computer protocols are introduced, storage routers will be increasingly essential to enable rapid, seamless communication among servers, storage devices and storage area network devices that use diverse protocols.

However, typical SANs are local Fibre Channel networks that serve one particular organization or one particular site. These SANs can be quite large, but cannot span great distances as they have distance limitations imposed upon them by the infrastructure necessary to carry Fibre Channel. For example, the Fibre Channel standard defines a means to communicate over spans up to 10 km and, in some cases, up to 30 km in length. In order to do this, however, the organization implementing the Fibre Channel network must typically own the fiber or lease dark fiber from some other party, which can be very expensive and, in most cases, is cost prohibitive.

This is because the fibers used to carry Fibre Channel traffic can carry only Fibre Channel protocol traffic. They cannot be shared with other protocols. It is therefore more cost effective to transmit data over long distances using a protocol that can be carried over already existing networks, such as those owned by phone companies that can carry ATM traffic, SONET traffic and IP traffic. Therefore, SANs are usually limited as to the geographic area that they can serve (i.e., they are limited to local operation). Furthermore, two or more geographically diverse SANs cannot interconnect in a seamless fashion such that they operate and behave as if they were local to one another because the infrastructure to connect them does not exist or is cost prohibitive.

Related U.S. Patent Application entitled "Encapsulation Protocol for Linking Storage Area Networks Over a Packet Based Network" Serial No. 60/165,194, filed on Nov. 12, 1999, (the "Encapsulation" patent application) discloses an encapsulation protocol for linking storage area networks over a packet-based network that addresses the problems discussed above. The Encapsulation application is hereby incorporated by reference in its entirety. However, even with the solutions provided by the Encapsulation application, connecting two or more SANs together using an extender, such as the encapsulation protocol of the Encapsulation application, requires the addresses of SCSI devices from one SAN to be mapped to an intermediate address to get across the extender, and then to be mapped to another address on a remote SAN. This must be done in order for initiators (hosts) on one SAN to be able to address SCSI devices on a remote SAN as if they were SCSI devices on the local SAN to which the initiator is attached. These mappings should be done in a generic fashion so that different types of architectures (i.e., parallel BUS, Fibre Channel Protocol, etc.) containing SCSI devices can all be mapped using the same method.

Some solutions do exist for mapping the addressing of SCSI devices between two SANs, but these typically attempt to propagate the entire address of a SCSI device across the extender and re-use the same address on the remote SAN. For example, a parallel BUS SCSI device on a first SAN may have an address of BUS:0, target:1, and LUN (logical unit identifier):0. In prior art methods and systems, the extender propagates this information from the first SAN to a remote SAN, where the same address is used to identify the device on the remote SAN. This approach, however, has a twofold problem. One, it uses a method of address mapping that is limited to a single type of architecture, i.e., the method only provides for mapping a single type of SCSI architecture SCSI device (e.g., parallel BUS SCSI devices). Two, because the device address must be the same on both sides of the extender, there is no means to dynamically map SCSI devices across the extender.

SUMMARY OF THE INVENTION

Therefore, a need exists for a method and system for mapping addressing of SCSI devices between two SANs connected by a SAN extender (transport layer) that can map SCSI device addresses in a generic fashion such that SCSI device architecture can be mapped using the same method.

Still further, a need exists for a method and system for mapping addressing of SCSI devices between two SANs that can dynamically map SCSI device addresses across a SAN extender.

The present invention provides a method and system for mapping addressing of SCSI devices between two SANs connected by a SAN extender over a packet-based network that can substantially eliminate or reduce the disadvantages and problems associated with use of a fibre channel protocol over large distances. In particular, the present invention provides a means for seamlessly interconnecting geographically distinct SANs, such that they operate as if they were local to one another by providing a means to generically and dynamically map SCSI device addresses between two SANs.

In particular, the present invention provides a method and system for accessing a device from a host, wherein the host and device are in separate SANs interconnected by a transport layer, and wherein the interface between the transport layer and the host SAN is a host node and the interface between the device SAN and the transport layer is a target node. The method of this invention comprises the steps of: at the target node, mapping the device address into a Target, Generic Identifier, and mapping the generic identifier into a transport identifier for identifying the device on the transport protocol; and, at the host node, mapping the device's transport identifier into a host generic identifier, and mapping the host generic identifier into an address accessible by the host. Each node can be a fibre channel-to-SCSI router, such as those manufactured by Crossroads Systems Inc., of Austin, Tex. The host generic identifier can comprise a mapping from the target node transport protocol address combined with the target generic identifier. The transport layer can be a packet-based network over which a SAN extender carries the FC protocol.

The present invention provides an important technical advantage of a method and system for mapping addressing of SCSI devices between two SANs connected by a SAN extender that can map SCSI device addresses in a generic fashion, such that any SCSI device architecture can be mapped using the same method.

Further still, the present invention provides an important technical advantage of a method and system for mapping addressing of SCSI devices between two SANs that can dynamically map SCSI device address across a SAN extender.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 is a simplified block diagram illustrating one implementation of the method and system of this invention within a typical SAN environment.

DETAILED DESCRIPTION OP THE INVENTION

Preferred embodiments of the present invention are illustrated in the FIGUREs, like numerals being used to refer to like and corresponding parts of various drawings.

The present invention provides a method and system for mapping addressing of SCSI devices between two SANs connected by a SAN extender across a packet-based network that take advantage of existing telecommunication networks to efficiently and cost-effectively connect multiple, and perhaps geographically diverse, SANs such that they can operate as if they were a single storage area network. Host devices on one SAN can therefore access target devices on a remote SAN as if the two were part of a single SAN. The method and system of this invention can thus effectively overcome the distance limitations of existing fibre channel networks so that the SAN model can be extended to many SANs over many miles. The present invention could, for example, be used to link a corporate SAN in Los Angeles to another corporate SAN in New York City or Tokyo. In the case of storage recovery, this invention will allow a backup library to reside off site at a remote location, thus ensuring data integrity should the local location be damaged by disaster, like fire or flood. SANs implementing the present invention thus need not be limited to local use only.

To connect local SANs over greater distances than allowed under the fibre channel protocol, the present invention can work together with the SAN extender disclosed in the Encapsulation application. The Encapsulation application defines an encapsulation protocol ("EP") that runs the Fibre channel protocol in such a way that it can travel over any packet-based transport, such as an asynchronous transfer mode ("ATM") or Ethernet network. Together with the extender disclosed in the Encapsulation application, the current invention provides a mechanism for generically mapping the addressing of SCSI devices on a SAN to one or more remote SANs, across any transport layer that is used to connect the SANs (e.g., ATM, gigabit Ethernet, or Fibre Channel).

A node (Fibre Channel-to-SCSI router) is used to connect each SAN to the extender transport maintains two mapping tables, as discussed more fully below, to map device addresses across the transport protocol to another node. The nature of the tables maintained by a node depends on whether the node is a host node, or a target node. This distribution is described more fully below.

The nodes at either end of the extender transport connecting any two SANs build their mapping tables slightly differently, depending on whether they are the target node or the host (initiator) node. A target node (to which target devices are attached) builds tables to map a SCSI device addresses into first a target generic identifier, and then to a transport identifier an (address) that is used on the extender transport protocol. An initiator node (the node to which hosts seeking to access a target device are attached) builds tables to map the address received from the extender protocol (the transport identifier) back into a valid SCSI device address based on the current architecture (e.g., parallel BUS, fibre channel, etc.) This method is explained more fully below.

According to the teachings of this invention, a target node first maps a SCSI device address to a target generic identifier on the target node. This target generic identifier can then be mapped into a transport identifier that is used as a device identifier on the extender transport. The target generic identifier and the transport identifier can, in some, instances, be the same. The target node informs the initiator node of the device transport identifier and also of the address of the target node on the extender transport. The initiator node is thus provided with the information needed to determine the target node that owns the SCSI device and also with the device transport identifier for the particular device. The initiator node can then map the target node address and device transport identifier to a host generic identifier on the initiator node, and then maps the host generic identifier to an address that can be presented to initiators on the local initiator SAN.

FIG. 1 is a simplified block diagram illustrating one implementation of the method and system of this invention within a typical SAN environment. Network 100 of FIG. 1 includes #1 host SAN 110 and #2 host SAN 112, which can be local fibre channel SANs. #1 host SAN 110 and #2 host SAN 112 can access target SAN 115, which can also be a local fibre channel SAN for, for example, tape backup and disk mirroring. #1 host SAN 110 is communicatively connected to #1 initiator node 120, and #2 host SAN 112 is communicatively connected to #2 initiator node 130. Target SAN 115 is communicatively connected to target node 150. #1 initiator node 120, #2 initiator node 130, and target node 150 can be fibre channel-to-SCSI routers, such as those manufactured and sold by Crossroads Systems Inc. of Austin, Tex. Nodes 120, 130 and 150 can be interfaces to the rest of the network 100 for SANs 110, 112 and 115.

The Fiber channel-to-SCSI routers that nodes 120, 130 and 150 comprise can all implement the EP layer (as disclosed in the Encapsulation application) such that the fibre channel protocol flows seamlessly over the packet-based WAN (wide area network) 140. WAN 140 represents a physical packet-based transport, such as ATM or Ethernet. WAN 140 can be a dedicated link or switched network. SANs 110, 112 and 115 are connected to their respective nodes via fibre channel links 190. Nodes 120, 130 and 150 can each be connected to WAN 140 via network links 192.

Fibre channel links 190 can be copper, Fibre optic links, or any other such network link as known to these familiar with the art, as required for a given application. Network links 192 can similarly be any such network link, as needed.

1 host SAN 110, #2 host SAN 112, and target SAN 115 can comprise multiple initiators and multiple targets, respectively. For example, target SAN 115 includes fibre channel hub (switch) 160, tape library 170, and disk 180. Although only tape library 170 and disk 180 are shown, multiple initiators and target devices can be attached to fibre channel hub 160 and through it to fibre channel-to-SCSI router (target node) 150. Target SAN 115 can thus comprise multiple hosts and multiple initiators.

The method and system of the present invention require an extender protocol to connect the two or more SANs between which target addresses will be mapped.

The Encapsulation Application discloses such an extender protocol (EP). The method and system for mapping SCSI addresses of the present invention uses this encapsulation protocol to provide a transport on which to carry the mapping used to allow initiators on one SAN to address SCSI devices on a remote SAN as if they were SCSI devices on the local SAN to which the initiator is attached. Devices on a remote SAN thus can be represented in such a way that they are made available to initiators on other SANs. The Encapsulation Application discloses a compatible encapsulation protocol that can be used with the present invention.

FIG. 1 illustrates how the method and system of this invention can be used to map SCSI device addresses between Fibre channel SANs interconnected over a network protocol, such as an ATM network. The example of FIG. 1 is used for illustrative purposes only, and does not preclude using the method and system of this invention for mapping other SCSI architecture device addresses or using a different protocol to interconnect the SANs.

To accomplish the mapping of the method and system of this invention, target node 150 will build two tables. The first table maps the address information for each SCSI device attached to target node 150 into a unique target generic identifier for each SCSI device. For example, if tape library 170 and disk 180 have FC addresses 0x1 and 0x2, respectively, and tape library 170 has two logical unit identifiers (LUNs) of 0, and 1, and disk 180 has a single LUN of 0, then the following table is created by target node 150 to map the SCSI device addresses to target generic identifiers.

TABLE 1

| Target Generic Identifier | FC Device Address | LUN Identifier |
| --- | --- | --- |
| 0 | 0 × 1 | 0 |
| 1 | 0 × 1 | 1 |
| 2 | 0 × 2 | 0 |

Target node 150 uses the target generic identifiers to map each device address into a transport identifier that can then be used to identify the device on the extender transport protocol. In this example, the device transport identifier on the extender transport protocol is the same as the generic identifier. However, this need not be the case, as other identifiers could instead be used. Table 2 below shows the mapping of target generic identifier to device transport identifier.

TABLE 2

| Target Generic Identifier | Transport Identifier |
| --- | --- |
| 0 | 0 |
| 1 | 1 |
| 2 | 2 |

Once Tables 1 and 2 are created, target node 150 can inform #1 initiator node 120 and #2 initiator node 130 of the target devices it has made available and their respective transport identifiers. The method for notifying other nodes in the network can be any method as known to those familiar in the art.

1 initiator node 120 and #2 initiator node 130 each similarly build two tables. The first table that each initiator node creates is used to map the target node's transport protocol address and each device transport identifier generated by target node 150 into a host initiator generic identifier within the local node. The host generic identifier associated with a given target device represents a combination of the target node transport protocol address and the devices transport identifier. Assuming for this example that target node 150 has an ATM address of 0x01020304, then the following Table 3 would be created in #1 initiator node 120 and #2 initiator node 130.

TABLE 3

| Host Generic Identifier | | Target Node Transport Address | Transport Identifier | |
| --- | --- | --- | --- | --- |
| 0 | (Tape) | 0 × 01020304 | 0 | (Tape) |
| 1 | (Tape) | 0 × 01020304 | 1 | (Tape) |
| 2 | (Disk) | 0 × 01020304 | 2 | (Disk) |

In this example, all devices attached to target node 150 are made available to #1 initiator node 120 and #2 initiator node 130. However, a target node, such as target node 150, may decide to make only selected devices accessible to initiator nodes by leaving selected SCSI device addresses out of the tables it generates for the mapping. Such different mapping configurations are intended to be within the scope of this invention. Any combination of such mappings is contemplated by this invention.

1 initiator node 120 and #2 initiator node 130 also build a table, such as Tables 4 and 5 below, that is map the host generic identifier into a form that can be used by hosts on the local SAN to address the target devices. In the examples shown below in Tables 4 and 5, the host generic identifiers are mapped into LUNs on a single fibre channel target. This fibre channel target is a simulated target within the host SAN that is sued to represent the remote target devices on target SAN 115 so that local hosts can access each device.

TABLE 4

| FC LUN (Initiator SAN on target) | Host Generic Identifier | |
| --- | --- | --- |
| 0 | 1 | (Tape) |
| 1 | 0 | (Tape) |
| 2 | 2 | (Disk) |

TABLE 5

| FCLUN | Host Generic Identifier | |
| --- | --- | --- |
| 0 | 2 | (Disk) |

The method and system of this invention can thus use a simulated target at a host SAN, onto which the can map the addresses of one or more real target devices located at a remote target SAN. The simulated fibre channel target to which the host generic identifier(s) are mapped can then be used to access the remote target device as if the remote target(s) were located within the local SAN.

The method and system of this invention do not preclude other mappings from occurring, i.e., each host generic identifier could instead be mapped to a unique simulated fibre channel target within the local host SAN. Any combination of such mappings can be used and is within the scope of this invention. In fact, initiator nodes may decide to map only selected target devices or to map all target devices. Target devices can also be mapped in any order. For example, in Table 4 above, #1 initiator node 120 has mapped all of the target devices from target SAN 115 into a simulated fibre channel target, but in a different order. Host generic identifier 1 is mapped to Fibre Channel LUN 0, host generic identifier 0 is mapped to Fibre Channel LUN 1, and host generic identifier 2 is mapped to Fibre Channel LUN 2. Any such combination is within the scope of this invention. By contrast, #2 initiator node 130 in this example maps only one target device, associated with host generic identifier 2, into a Fibre Channel LUN 0.

By using these mapping tables, initiators on local SANs connected to #1 initiator node 120 and #2 initiator node 130 can access the SCSI target devices on target SAN 115 connected to target node 150. According to the teachings of this invention, all such remote target devices, or a limited number of such devices, can be made accessible to remote initiator SANs from a local target SAN. The present invention thus allows any type of SCSI target device to be accessed across any type of extender protocol by mapping the device addresses in a generic fashion. In addition, the method and system of this invention provide the capability to access all such target devices, or only a limited number of such target devices, on a target SAN from one or more remote initiator SANs, depending on the mapping tables created. The present invention also allows multiple SANs of different architectures and protocols to be interconnected in a generic fashion.

The method and system of this invention can be implemented within a fibre channel-to-SCSI router, such as routers 120, 130 and 150 of FIG. 1 (nodes 120, 130 and 150).

The present invention can be implemented purely as computer executable software instructions stored in memory within the fibre channel-to-SCSI routers, and can be easily upgraded as new versions with new functionality are created. No change in the hardware of existing fibre channel-to-SCSI routers is required to incorporate this invention. The memory in which the software instructions of this invention can be stored can be RAM (random access memory) or ROM (read-only memory) or other such memory storage devices.

The method and system of this invention can be used with any compatible encapsulation protocol, such as that disclosed in the Encapsulation Application, and can be used over existing Internet infrastructures and other existing network protocols. For example, the extension protocol can be a typical IP network protocol, an ATM network, gigabit Ethernet, or any protocol that allows data packets to flow between nodes. The method and system of this invention allows for mapping of SCSI device addresses between any SCSI protocol SANs on either end of an extension network.

The present invention is not limited to use in applications having storage area networks that each use the same fibre channel protocol. For example, target host 115 and initiator hosts 110 and 112 of FIG. 1 can each use a different protocol and the method and system for mapping SCSI target device addresses of this invention can continue to function as disclosed herein. However, a compatible encapsulation protocol is required.

The present invention provides the capability for extending a SAN model to many SANs over distances much greater than those currently allowed by the fibre channel protocol. This invention provides the capability to interconnect SANs in geographically diverse locations, such as different cities, in such a way that they can function in a seamless manner as if they comprise a single local SAN. Further, for storage recovery purposes, the present invention allows a backup library to reside off site at a remote location, thus ensuring data integrity should the local location be damaged by some failure or disaster.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for mapping addresses of SCSI devices, comprising:
   a plurality of storage area networks; and
   a storage area network extender that connects at least two storage area networks of the plurality of storage area networks;
   a device located on a first storage area network of the at least two storage area networks;
   a first node to connect the first storage area network to the storage area network extender, wherein the first node is configured to map a first device address for the device located on the first storage area network to an intermediary device identifier;
   a host located on a second storage area network of the at least two storage area networks;
   a second node located on the second storage area network, wherein the second node is configured receive the intermediary device identifier from the first node via the storage area network extender and map the intermediary device identifier to a second device address accessible by the host.

2. The system for mapping addresses of SCSI devices of claim 1, wherein said storage area network extender seamlessly interconnects said at least two storage area networks.

3. The system for mapping addresses of SCSI devices of claim 2, wherein said plurality of storage area networks are geographically distinct.

4. The system for mapping addresses of SCSI devices of claim 1, wherein mapping a first device address for the device located on the first storage area network to the intermediary device identifier further comprises mapping the first device address to a generic transport identifier; and
   wherein mapping the intermediary identifier to a second device address accessible by the host further comprises mapping the generic transport identifier to the second device address.

5. The system for mapping addresses of SCSI devices of claim 4, wherein mapping the first device address to the generic transport identifier further comprises mapping the first device address to a generic target identifier and mapping the generic target identifier to the generic transport identifier; and
   wherein mapping the transport identifier to the second device address further comprises mapping the generic transport identifier and a first node address to a generic host identifier.

6. The system for mapping addresses of SCSI devices of claim 5, wherein said nodes comprise a Fibre channel-to-SCSI router.

7. The system for mapping addresses of SCSI devices of claim 1, wherein said intermediary device identifier comprises:
   a node identifier; and
   a generic device identifier.

8. The system for mapping addresses of SCSI devices of claim 1, wherein first node is operable to inform said second nodes of said device.

9. The system for mapping addresses of SCSI devices of claim 1, wherein first and second storage area networks communicate over the storage area network extender via an encapsulation protocol that encapsulates fiber channel protocol messages.

10. A method for mapping addresses of SCSI devices, comprising the steps of:
    identifying a host located on a first storage area network;
    identifying a device located on at least one additional storage area network;
    interconnecting said first storage area network with said at least one additional storage area network via a transport layer;
    mapping a device address into an intermediary device identifier at a first node connected to the at least one additional storage area network; and mapping said intermediary device identifier into an address accessible by said host at a second node connected to the first storage area network.

11. The method of claim 10, wherein said second node provides an interface between said transport layer and said first storage area network and said second node provides an interface between said transport layer and said at least one additional storage area.

12. The method of claim 11, wherein said step of mapping a device into said intermediary device identifier takes place at each node.

13. The method of claim 11, wherein said step of mapping said intermediary device identifier into an address accessible by said host takes place at each node.

14. The method of claim 11 wherein said nodes comprise a Fibre channel-to-SCSI router.

15. The method of claim 11, wherein said storage area networks are geographically distinct.

16. The method of claim 10, wherein said intermediary device identifier comprises:
   a node identifier; and
   a generic device identifier.

17. The method of claim 16, wherein said transport layer comprises a packet-based network.

18. A system for mapping addresses of SCSI devices, comprising:
   a SCSI device located on a first storage area networks within a plurality of storage area networks;
   a host located on a second storage area network within said plurality of storage area networks;
   a first node to connect the first storage area network to a packet based network, wherein the first node is configured to map a first device address for the SCSI device to an intermediary device identifier; and
   a second node to connect the second storage area network to the packet based network, wherein the second node is configured to receive the intermediary device identifier from the first node via the storage area network extender and map the intermediary device identifier to a second device address accessible by the host.

19. The system for mapping addresses of SCSI devices of claim 18, wherein at least a pair of said storage area networks within said plurality of storage area networks are geographically distinct.

20. The system for mapping addresses of SCSI devices of claim 18, wherein said nodes comprise a Fibre channel-to-SCSI router.

21. The system for mapping addresses of SCSI devices of claim 18, wherein said intermediary device identifier comprises:
   a node identifier; and
   a generic device identifier.

22. A system for mapping a first address of a device, comprising:
   a plurality of storage area networks on which is located said device and a host; and
   a storage area network extender that connects at least two storage area networks of said plurality of storage area networks over a first network;
   a device located on a first storage area network of the at least two storage area networks;
   a first node to connect the first storage area network to the storage area network extender, wherein the first node is configured to map a first device address for the device located on the first storage area network to an intermediary device identifier;
   a host located on a second storage area network of the at least two storage area networks;
   a second node to connect second storage area network to the storage area network extender, wherein the second node is configured receive the intermediary device identifier from the first node via the storage area network extender and map the intermediary device identifier to a second device address accessible by the host.

23. The system of claim 22, wherein said storage area network extender seamlessly interconnects said at least two storage area networks of said plurality of storage area networks.

24. The system of claim 23, wherein said plurality of storage area networks are located at different geographical locations.

25. The system of claim 22, wherein mapping a first device address for the device located on the first storage area network to the intermediary device identifier further comprises mapping the first device address to a generic transport identifier; and
   wherein mapping the intermediary identifier to a second device address accessible by the host further comprises mapping the generic transport identifier to the second device address.

26. The system of claim 25, wherein mapping the first device address to the generic transport identifier further comprises mapping the first device address to a generic target identifier and mapping the generic target identifier to the transport identifier; and
   wherein mapping the transport identifier to the second device address further comprises mapping the generic transport identifier and a first node address to a generic host identifier.

27. The system of claim 22, wherein said device is a SCSI device, and wherein each of said nodes comprises a Fibre Channel-to-SCSI router.

28. The system of claim 22, wherein said intermediary device identifier comprises:
   a node identifier; and
   a generic device identifier.

29. The system of claim 22, wherein first node is operable to inform said said second node of said device located on the first storage area network.

30. The system of claim 22, wherein said plurality of storage area networks communicate via an encapsulation protocol.

31. The system of claim 22, wherein said first network is a packet-based network.

32. The system of claim 31, wherein said device is a SCSI device.

33. The system of claim 22, wherein said device is a SCSI device.

34. A method for mapping a first address of a device, comprising:
   identifying a host located on a first storage area network;
   identifying said device located on a second storage area network;
   interconnecting said first storage area network with said second storage area network via a transport layer;

mapping said first address into an intermediary device identifier at a first node connected to the second storage area network; and mapping said intermediary device identifier into a second address accessible by said host at a second node connected to the first storage area network.

35. The method of claim 34, wherein wherein said second node provides an interface between said transport layer and said first storage area network and said first node provides an interface between said transport layer and said second storage area network.

36. The method of claim 35, wherein:

mapping said first address into said intermediary device identifier takes place at each node of said plurality of nodes.

37. The method of claim 35, wherein:

mapping said intermediary device identifier into said second address accessible by said host takes place at each node of said plurality of nodes.

38. The method of claim 35, wherein:

said device is a SCSI device; and each one of said nodes comprises a Fibre Channel-to-SCSI router.

39. The method of claim 34, wherein said intermediary device identifier comprises:

a node identifier; and a generic device identifier.

40. The method of claim 39, wherein said transport layer comprises a packet-based network.

41. The method of claim 34, wherein said first storage area network and second storage area network are located at different geographic locations.

42. The method of claim 34, wherein said device is a SCSI device.

43. A system for mapping a first address of a device, comprising:

said device located on a first storage area network within a plurality of storage area networks;

a host located on a second storage area network within said plurality of storage area networks;

a first node to connect the first storage area network to a packet based network, wherein the first node is configured to map a first device address for the SCSI device to an intermediary device identifier;

a second node to connect the second storage area network to the packet based network, wherein the second node is configured to receive the intermediary device identifier from the first node via the storage area network extender and map the intermediary device identifier to a second device address accessible by the host.

44. The system of claim 43, wherein said intermediary device identifier comprises:

a node identifier; and a generic device identifier.

45. The system of claim 43, wherein at least a pair of storage area networks within said plurality of storage area networks are located at different geographic locations.

46. The system of claim 43, wherein said device is a SCSI device, and wherein each of said nodes comprises a Fibre Channel-to-SCSI router.

47. The system of claim 43, wherein said plurality of storage area networks and each of said nodes are part of a packet-based network.

48. The system of claim 47, wherein said device is a SCSI device.

49. The system of claim 43, wherein said device is a SCSI device.

* * * * *